United States Patent
Schuster et al.

(10) Patent No.: US 8,139,783 B2
(45) Date of Patent: Mar. 20, 2012

(54) SPEAKER ASSEMBLY ARRANGEMENT FOR A VEHICLE AND METHOD OF MOUNTING A SPEAKER

(75) Inventors: Michael Schuster, Munich (DE); Joerg Prokisch, Schwarzach (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 366 days.

(21) Appl. No.: 12/463,820

(22) Filed: May 11, 2009

(65) Prior Publication Data
US 2009/0279733 A1    Nov. 12, 2009

(30) Foreign Application Priority Data

May 9, 2008    (EP) .................................... 08008737

(51) Int. Cl.
| | |
|---|---|
| H04B 1/00 | (2006.01) |
| H04R 1/02 | (2006.01) |
| H04R 3/00 | (2006.01) |
| H04R 5/02 | (2006.01) |
| H05K 5/00 | (2006.01) |
| A47B 81/06 | (2006.01) |
| A41H 37/06 | (2006.01) |
| B29D 5/00 | (2006.01) |
| B21D 53/50 | (2006.01) |
| B21F 45/18 | (2006.01) |
| H04R 31/00 | (2006.01) |
| H01F 3/04 | (2006.01) |
| H01F 7/06 | (2006.01) |

(52) U.S. Cl. ............. 381/86; 381/87; 381/96; 381/302; 381/386; 381/387; 381/389; 181/150; 181/152; 181/156; 181/199; 29/33.2; 29/408; 29/594; 29/609.1; 29/766

(58) Field of Classification Search .............. 381/86, 381/87, 302, 387, 389, 96, 386; 181/150, 181/152, 156, 199; 29/33.2, 408, 594, 609.1, 29/766

See application file for complete search history.

(56) References Cited

U.S. PATENT DOCUMENTS

| | | | | |
|---|---|---|---|---|
| 3,855,429 A | * | 12/1974 | Krainhofer | 381/392 |
| 4,122,911 A | * | 10/1978 | Croup | 181/199 |
| 4,546,850 A | * | 10/1985 | Litner | 181/141 |
| 4,565,905 A | * | 1/1986 | Nation | 381/186 |
| 4,797,935 A | * | 1/1989 | Tanaka | 381/392 |
| 4,923,032 A | * | 5/1990 | Nuernberger | 181/150 |
| 5,367,576 A | * | 11/1994 | Matsumoto et al. | 381/341 |

(Continued)

FOREIGN PATENT DOCUMENTS

DE    19622308    7/1997

(Continued)

*Primary Examiner* — Ida M Soward

(74) *Attorney, Agent, or Firm* — O'Shea Getz P.C.

(57) ABSTRACT

A speaker assembly arrangement for a vehicle is provided that includes a speaker unit including a speaker cabinet defining a first volume and a body part of a vehicle including a hollow member defining a second volume. The speaker cabinet is acoustically coupled to the hollow member by a press-fit coupling having a press-fit direction and mounted on the body part by at least one fastener having a fastening direction substantially perpendicular to the press-fit direction. The body part comprises a first guide arranged and configured to slidably engage with a second guide arranged on the speaker cabinet so that force on the speaker cabinet in the fastening direction is at least in part redirected to the press-fit direction by the slidable engagement of the first guide and the second guide.

29 Claims, 5 Drawing Sheets

U.S. PATENT DOCUMENTS

| | | | | |
|---|---|---|---|---|
| 5,734,131 A | * | 3/1998 | Sakamoto | 181/141 |
| 5,736,689 A | * | 4/1998 | Van Hout et al. | 181/141 |
| 5,739,481 A | * | 4/1998 | Baumhauer et al. | 181/148 |
| 5,883,966 A | * | 3/1999 | Kubo | 381/386 |
| 6,030,275 A | * | 2/2000 | Lofaro | 451/5 |
| 6,031,924 A | * | 2/2000 | Etzel | 381/389 |
| 6,101,262 A | * | 8/2000 | Haase et al. | 381/386 |
| 6,134,332 A | * | 10/2000 | Wiener | 381/160 |
| 6,405,986 B1 | * | 6/2002 | Swadling | 248/342 |
| 6,529,610 B1 | * | 3/2003 | Ogawa et al. | 381/388 |
| 6,763,120 B2 | * | 7/2004 | Sugiyama et al. | 381/395 |
| 6,774,510 B1 | * | 8/2004 | Moro et al. | 310/12.24 |
| 7,121,756 B2 | * | 10/2006 | Wright et al. | 403/128 |
| 7,162,050 B2 | * | 1/2007 | Furuya et al. | 381/351 |
| 7,171,013 B2 | * | 1/2007 | Kosatos et al. | 381/182 |
| 7,178,628 B2 | * | 2/2007 | Gordon | 181/153 |
| 7,242,787 B2 | * | 7/2007 | D'Hoogh | 381/412 |
| 7,377,358 B2 | * | 5/2008 | Sasaki et al. | 181/171 |
| 7,522,742 B2 | * | 4/2009 | Francisco et al. | 381/345 |
| 2004/0141625 A1 | | 7/2004 | Leipold | 381/86 |
| 2006/0254853 A1 | * | 11/2006 | Van Gieson | 181/191 |
| 2009/0279732 A1 | * | 11/2009 | Maurer et al. | 381/387 |

FOREIGN PATENT DOCUMENTS

| | | |
|---|---|---|
| DE | 19909143 | 11/2000 |
| EP | 2181895 A2 * | 5/2010 |
| JP | 07162981 A * | 6/1995 |
| JP | 2005014768 A * | 1/2005 |

* cited by examiner

SPEAKER ASSEMBLY ARRANGEMENT FOR A VEHICLE AND METHOD OF MOUNTING A SPEAKER

CLAIM OF PRIORITY

This patent application claims priority to European Patent Application serial number 08 008 737.2 filed on May 9, 2008.

FIELD OF TECHNOLOGY

The invention relates to a speaker assembly arrangement for a vehicle and a method of mounting a speaker, in particular, a method of mounting a speaker onto a body part of a vehicle.

RELATED ART

Typically, in a motor vehicle, there are limited locations that offer both a large flat surface and a large resonant volume onto and in which low-frequency loudspeakers may be mounted. For example, a large resonant volume is required to install and effectively use low-frequency loudspeakers in motor vehicles. However, motor vehicles generally have limited available space for such large resonant volumes. In addition, possible locations that could provide large resonant volumes are often not suitable for installing low-frequency loudspeakers, since low-frequency loudspeakers generally require a large, substantially flat surface onto which they can be mounted.

Arrangements are known in which a low-frequency loudspeaker cabinet is fitted under a vehicle seat. However, the space available for installing the low-frequency loudspeaker under the seat is extremely small since the loudspeaker should be covered by the seat independent of how the seat is adjusted (i.e., the position and/or the configuration the seat is in). Additionally, space is often required under the seat to ensure that rear seat passengers have sufficient foot room. Therefore, the space available for the cabinet carrying the loudspeaker may be limited to such a degree that the sound quality of the arrangement is poor.

One way to enlarge the resonant volume is to couple the enclosure provided by the speaker cabinet under the seat to one or more enclosures established by body parts of the vehicle. The coupling between the speaker cabinet and the body parts of the vehicle should provide an acoustically sealed and waterproof connection between the cabinet and the enclosures defined by the body parts. This may be provided by sealing rings together with fasteners (e.g., screw fasteners) to fasten the cabinet to the body part of the vehicle.

Arrangements are known in which the speaker is mounted on the body part by a plurality of screw fasteners. The screw fasteners for a single speaker may be positioned in different orientations. For example, where the cabinet is mounted on the floor panel under the seat of the vehicle, the screw fasteners are orientated perpendicular to the floor panel. In another example, where the cabinet is mounted on a body part of the vehicle with an acoustically sealed water-tight connection, the screw fasteners are orientated parallel to the floor of the vehicle. However, affixing screw fasteners may be relatively time-consuming and, depending on their position and orientation, awkward to tighten.

Therefore, there is a need for a speaker assembly arrangement that improves the ease of mounting one or more speakers on a body part of a vehicle.

SUMMARY OF THE INVENTION

In one embodiment, a speaker assembly arrangement for a vehicle includes a speaker unit and a body part. The speaker unit includes a speaker cabinet defining a first volume, where the speaker cabinet has a speaker through-hole having a longitudinal axis and is arranged in a side face of the speaker cabinet. The body part of the vehicle includes a hollow member defining a second volume, where the hollow member has a body through-hole. The speaker through-hole is coupled to the body through-hole by an air tight press-fit coupling having a press-fit direction arranged generally along the longitudinal axis of the speaker though-hole, and where the first volume of the speaker cabinet and the second volume of the hollow member of the body part are acoustically coupled. The speaker cabinet is mounted on the body part by at least one fastener positioned adjacent the hollow member of the body part, and where the at least one fastener has a fastening direction substantially perpendicular to the press-fit direction. The body part includes a first guide arranged and configured to slidably engage with a second guide arranged on the speaker cabinet such that when the second guide contacts the first guide, force on the speaker cabinet in the fastening direction is at least in part redirected to the press-fit direction by the slidable engagement of the first guide and the second guide.

In another embodiment, a method for mounting a speaker unit onto a body part of a vehicle includes: (1) providing a body part of a vehicle including a first guide and a hollow member defining a second volume, the hollow member having a body through-hole; (2) providing a speaker unit including a speaker cabinet defining a first volume, the speaker cabinet including a second guide and a speaker through-hole in a side face, the speaker though-hole having a longitudinal axis defining a press-fit direction, the first guide of the body part being arranged and configured to slidably engage with the second guide arranged on the speaker cabinet; (3) arranging the second guide on the speaker cabinet in contact with the first guide of the body part; (4) exerting force on the speaker cabinet in a direction generally perpendicular to the press-fit direction and slidably engaging the first guide and the second guide, whereby the force is at least in part redirected to the press-fit direction so as to couple the speaker through-hole to the body through-hole by an air tight press-fit coupling and to acoustically couple the first volume of the speaker cabinet and the second volume of the hollow member of the body part; and (5) mounting the speaker cabinet onto the body part by at least one fastener positioned adjacent the hollow member of the body part, the at least one fastener having a fastening direction substantially perpendicular to the press-fit direction.

In another embodiment, a speaker assembly is acoustically coupled with a first internal volume defined by a body part of a motor vehicle, where the body part has a first guide and a body through-hole acoustically coupled to the first internal volume, includes a speaker cabinet, a second guide, and a fastener. The speaker cabinet defines a second internal volume and has a speaker through-hole disposed on one side thereof, where the speaker through-hole is positioned such that when the speaker assembly is coupled to the body part, the first and the second internal volumes are acoustically coupled through the speaker and the body through-holes. The second guide is disposed on the speaker cabinet and is adapted such that when the speaker assembly is coupled to the body part, the first and the second guides slidably engage thereby aligning and press fitting, in a first direction, the speaker through-hole in the speaker cabinet to the body through-hole in the body part, where the second guide is located at or near a side of the speaker cabinet substantially opposite the side in which the speaker through-hole is disposed. The fastener is disposed on the speaker cabinet and is operable to removably secure the speaker cabinet to the body part in a second direction that is substantially perpendicular to the first direction.

DESCRIPTION OF THE DRAWINGS

The invention can be better understood with reference to the following drawings and description. The components in the figures are not necessarily to scale, instead emphasis is placed upon illustrating the principles of the invention. Moreover, in the figures, like reference numerals designate corresponding parts. In the drawings.

DETAILED DESCRIPTION

Figure 1A:
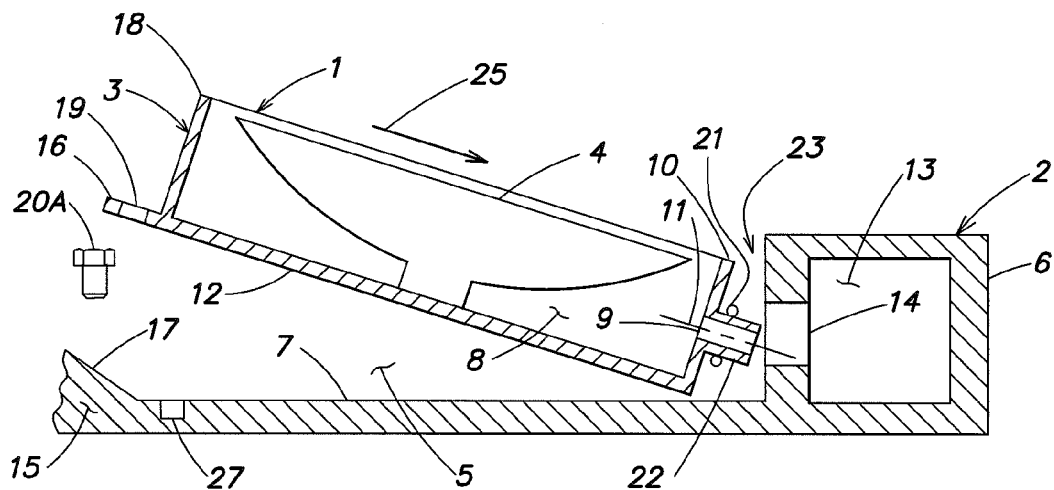
FIGS. 1A, 1B and 1C illustrate an exemplary speaker assembly arrangement having a screw fastener.
Figure 1B:
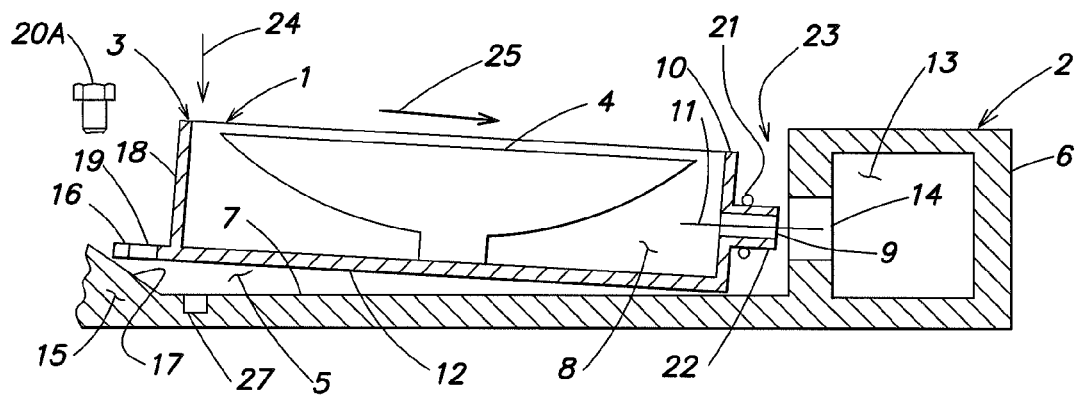
Figure 1C:
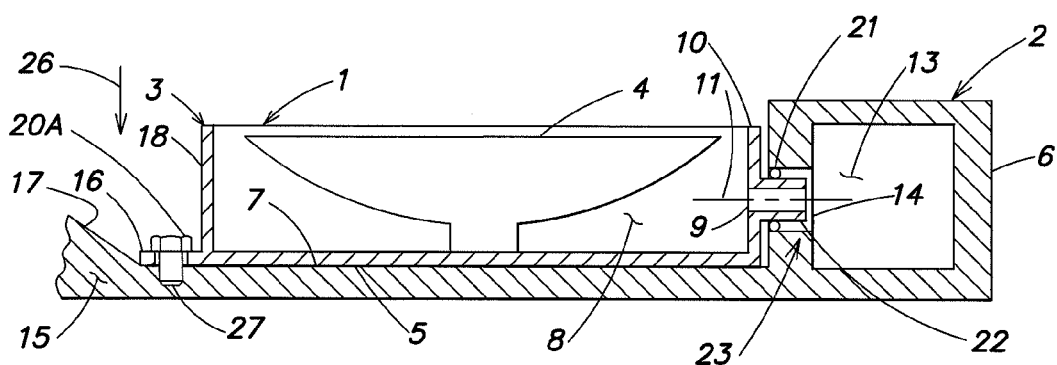

FIGS. 1A, 1B and 1C illustrate an exemplary speaker assembly arrangement for a vehicle and, in particular, illustrate three stages in the mounting of a speaker unit 1 to a body part 2 of the vehicle.

The speaker unit 1 includes a speaker cabinet 3 holding a speaker body 4. The speaker unit 1 is, in plan view, generally square, however, is not limited thereto. The body part 2 of the vehicle is a contoured region of the inner vehicle bodywork arranged under a seat (not shown) of the vehicle which provides a mounting position 5 for the speaker unit 1. The body part 2 may include a sill 6 and a floor panel 7 of the vehicle, where the sill 6 extends generally vertically upwards from the floor panel 7.

The speaker cabinet 3 defines a first resonant volume 8 and includes a speaker through-hole 9 arranged in a side face 10 of the speaker cabinet 3. The speaker through-hole 9 has a longitudinal axis 11 which extends generally perpendicularly to the side face 10 and parallel to the base 12 of the speaker cabinet 3. The sill 6 of the body part 2 is hollow and defines a second resonant volume 13. The hollow sill 6 includes a body through-hole 14.

The body part 2 includes a first guide 15 arranged and configured to slidably engage with a second guide 16 arranged on the speaker cabinet 3. The first guide 15 of the body part 2 is provided by an inclined surface 17 arranged on the floor panel 7 defining a ramp. The incline increases in height in a direction away from the sill 6. The first guide 15 and the sill 6 are arranged to provide a mounting position 5 in which the speaker cabinet 3 may be accommodated.

The second guide 16 of the speaker cabinet 3 is provided by a protruding portion which extends from a side face 18 of the speaker cabinet 3, in particular from the side face 18 opposing the side face 10 in which the speaker through-hole 9 is arranged. The second guide 16 includes at least one through-hole 19 for accommodating at least one screw fastener 20A for fastening the speaker cabinet 3 to the body part 2, in particular, to the floor panel 7 of the body part 2.

To mount the speaker cabinet 3 onto the body part 2, the speaker cabinet 3 is arranged such that the side face 10 with the speaker through-hole 9 faces the body through-hole 14 of the sill 6. A sealing ring 21 (e.g., an annular elastic ring) is provided around a protruding portion 22 defining the speaker through-hole 9. The protruding portion 22 and sealing ring 21 are configured to be accommodated within the body through-hole 14 such that the speaker cabinet 3 can be coupled to the sill 6 by a press-fit connection 23. In some embodiments, the press-fit connection 23 is air tight as well as watertight and allows the first resonant volume 8 of the speaker cabinet 3 to be acoustically coupled to the second resonant volume 13 of the sill 6.

FIG. 1B illustrates the coupling of the speaker cabinet 3 to the sill 6 by the press-fit coupling 23. The second guide 16 of the speaker cabinet 3 is arranged in contact with the inclined surface 17 of the first guide 15 arranged on the floor panel 7. Force is provided on the speaker cabinet in a downward direction as indicated by the arrow 24. The second guide 16 slidably engages with the first guide 15 so that the force 24 in the downward direction is at least in part redirected in a sideways direction, as indicated by the arrow 25 and is redirected along the longitudinal axis 11 of the speaker through-hole 9 in a press-fit direction.

The protruding portion 22 is pushed into the body through-hole 14 of the sill 6 as a result of this redirected force and a seal is produced by the axial compression of the sealing ring 21 between the protrusion 22 and body through-hole 14. A press-fit connection 23 is produced between the protruding portion 22 defining the speaker through-hole 9, the sealing ring 21 and the body through-hole 14 as a result of the downward force exerted on the opposing side of the speaker cabinet 3. The press-fit connection 23 is air tight and acoustically couples the first volume 8 of the speaker cabinet 3 and the second volume 13 of the sill 6 of the body part 2 and increases the resonance volume of the speaker unit 1.

Referring to FIG. 1C, the speaker cabinet 3 is illustrated mounted on the body part 2 by a screw fastener 20A. The screw fastener 20A has a fastening direction 26 which is generally perpendicular to the longitudinal axis 11 of the speaker through-hole 9. The fastening direction 26 is generally parallel to the direction of the force exerted on the first guide 15 and the second guide 16. The screw fastener 20A is positioned in the through-hole 19 of the second guide 16 and engages a threaded hole 27 positioned in the body panel 2. The threaded hole 27 of the screw fastener 20A is positioned at the base of the inclined surface 17 in the floor panel.

Although the fastener assembly and the first and the second guides 15, 16 are illustrated as being integral with the speaker unit 1 and the body part 2, they may also be provided as part of an interior trim panel positioned on the body panel of the vehicle. Although the second guide 16 is illustrated in FIG. 1 arranged adjacent the side face 18 of the speaker cabinet 3 which opposes the side face 10 by which the speaker cabinet is acoustically coupled to the sill 6, the guide may also be arranged adjacent the other two side faces of the speaker cabinet, that is those side faces extending between the two illustrated side faces 10, 18.

The hollow member of the body part 2 providing the second resonance volume 13 is illustrated in the FIGs. as a sill of the body part 2. However, other hollow members of the body part such as, but not limited to, a seat cross-beam may also be used.

In the arrangement shown in FIGS. 1A, 1B and 1C, the speaker cabinet 1 is mounted on the body part 2 and in the mounting position 5, by the screw fastener 20A which extends perpendicularly to the plane of the floor panel 7 and by the press-fit connection 23 between the speaker cabinet 3 and the sill 6. This arrangement has the advantage that only one type of screw-fastener 20A arranged in a single fastening direction 26 is required to mount the speaker unit 1 on the body part 2 since the speaker cabinet 3 is further fastened to the sill 6 through the press-fit connection 23.

Further fastening in a perpendicular direction to the fastening direction 26 which extends directly between the sill 6 and the speaker cabinet 3 is not provided since the press-fit connection 23 provides the coupling. The speaker unit may be mounted on the body part 2 simply and quickly since one or more screw fasteners 20A are arranged in a single orientation, perpendicular to the floor panel 7, and are also positioned so that they are easy to access.

Figure 2A:
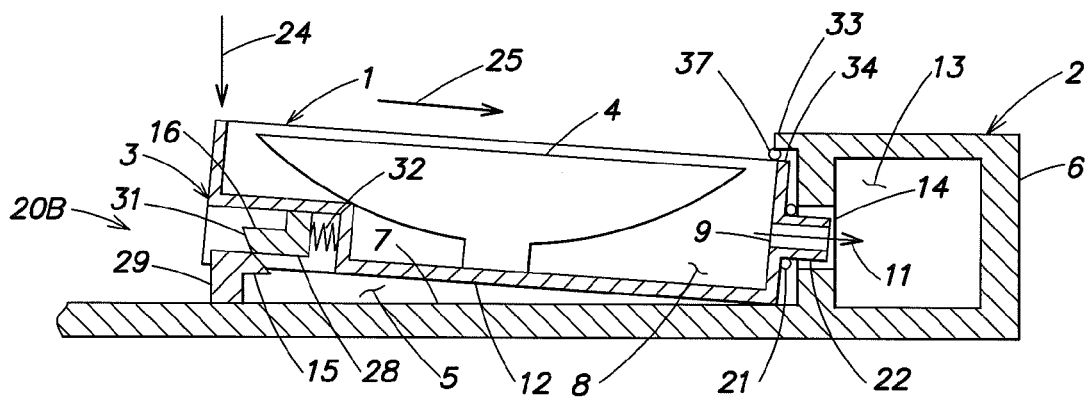
FIGS. 2A and 2B illustrate an exemplary speaker assembly arrangement having a snap-fit fastener.
Figure 2B:
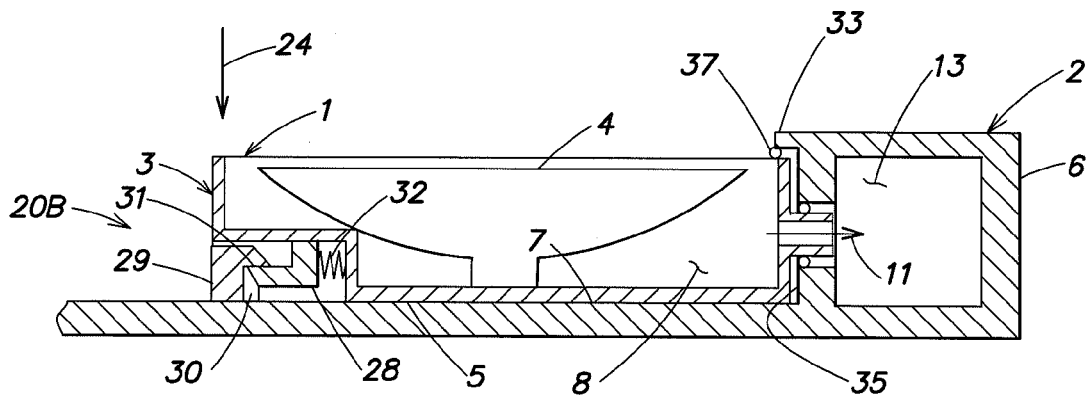

FIGS. 2A and 2B illustrate a speaker assembly arrangement where the speaker unit 1 and the speaker cabinet 3 are mounted onto the body part 2 by a snap-fit fastener 20B rather than a screw fastener 20A as is the arrangement illustrated in FIGS. 1A-1C.

The snap-fit fastener 20B includes a first resilient member 28 and a second rigid member 29 which are configured to define a snap-fit fastener when they are engaged with one another. In the drawings, the size of the resilient engagement member 28 and the rigid member 29 is exaggerated with respect to the size of the speaker unit 1 for illustrative purposes.

The rigid member 29 is arranged on, and integral with, the floor panel 7 and comprises a recess 30 for accommodating the resilient member 28. The resilient member 28 of the snap-fit fastener 20B is configured on the speaker cabinet 3 and includes a protruding portion 31 which has a form configured to be accommodated within the recess 30 of the rigid engagement member 29 (e.g., mate with the rigid engagement member 29) and exhibit resilience such that a snap-fit is defined when the rigid member 29 and the resilient member 28 are engaged with one another.

In the arrangement shown in FIG. 2A, the resilience of the resilient member 28 is provided by a spring member 32 arranged between the protruding portion 31 and the speaker cabinet 3 that allows the protruding portion 31 to move by compressing the spring member 32. However, in other arrangements the resilience of the resilient member 28 is provided by forming the resilient member from a resilient material such as, but not limited to, an elastic material. In other arrangements, the resilient member 28 may be provided by a protrusion comprising a portion with a reduced cross-section about which the remaining protrusion may be deflected (e.g., a springed cantilever).

The speaker assembly arrangement further includes a retaining member 33 in the form of a protrusion extending from the sill 6 in the direction of the snap-fit fastener 20B and into the mounting position 5 which is configured to receive the speaker unit 1. The retaining member 33 is arranged so that the height of the speaker cabinet 3 may be accommodated between the lower surface of the retaining member 33 and the upper surface of the floor panel 7.

The retaining member 33 extends along the side of the speaker cabinet 3. Alternatively, the retaining member 33 may be provided by one or more protrusions spaced at intervals along the side of the speaker cabinet 3 which collectively retain the speaker cabinet 3 against the upper surface of the floor panel 7 so as to hinder or prevent vertical movement of the speaker cabinet 3. The resilient member 28 of the snap-fit fastener 20B defines the second guide 16 of the speaker cabinet 3 and the rigid member 29 of the snap-fit fastener 20B defines the first guide 15 of the body part 2.

To mount the speaker unit 1 onto the body part 2, the speaker cabinet 3 is slid into the mounting position 5 such that the side face 10 of the speaker cabinet 3 including the speaker through-hole 9 is positioned in the area between the retaining member 33 and the floor panel 7 and faces the body through-hole 14 arranged in the sill 6. The speaker cabinet 3 is pivoted about an axis 34 which extends generally parallel to the floor panel 7 and the edge 37 of the speaker unit 1 such that the base 12 of the speaker cabinet 3 is lowered towards the floor panel 7 and the resilient member 28 comes into contact with the rigid member 29 arranged on the floor panel. A mechanical force, indicated by arrow 24, is exerted on the resilient member 28 in a direction generally perpendicular to be upper surface of the floor panel 7 so as to slidably engage the resilient member 28 with the rigid member 29 such that the downward force indicated by the arrow 24 is at least in part redirected perpendicularly, as indicated by the arrow 25 so as to push the protruding portion 22 defining the speaker through-hole 9 into the body through-hole 14 and acoustically couple the first resonance volume 8 defined by the speaker cabinet 3 with the second resonance volume 13. A snap-fit connection is defined by and between the resilient member 28 and the rigid member 29 thus mounting the speaker cabinet 3 to the body part 2. The mounted speaker unit 1 is illustrated in FIG. 2B.

The speaker cabinet 3 is mounted on the body part 2 by a snap-fit fastener 20B which is engaged by press-fitting the rigid member 29 and resilient member 28 together without the use of additional tools. The simple mounting method of arranging the speaker unit 1 in the mounting position 5 of the panel and snap-fitting the resilient member 28 onto the rigid member 29 provides a simple and fast method of mounting the speaker unit 1 to the body part 2 of the vehicle. This arrangement has the advantage of eliminating the need for screw fasteners and therefore providing a simpler and quicker assembly arrangement. The provision and configuration of the retaining member 33 also hinders or prevents movement of the speaker cabinet 3 in vertical direction, thus reducing the likelihood of rattles.

FIG. 2B illustrates that the speaker cabinet 3 is retained in the mounting position 5 between the floor panel 7 and retaining member 33 to prevent the speaker unit 1 from moving in the vertical direction. The longitudinal position of the speaker unit 1 is determined by the side face 35 of the sill 6 and the rigid retaining member 29 positioned on the floor panel 7. Movement of the speaker unit 1 laterally, orthogonally to the sill 6, into and out of the paper in the view of FIG. 2B, is prevented by the snap-fit fastener 20B as the protruding member 31 is accommodated within a recess 30 with side walls that extend around at least two opposing sides of the protrusion 31. In further examples of a speaker assembly arrangement, the first guide 15 and the second guide 16 are configured separate from the snap-fit fastener 20B. For example, the screw fastener 20A of FIG. 1 is replaced by a snap-fit fastener while the inclined surface 17 and second guide 16 of the speaker cabinet 3 are retained.

Figure 3:
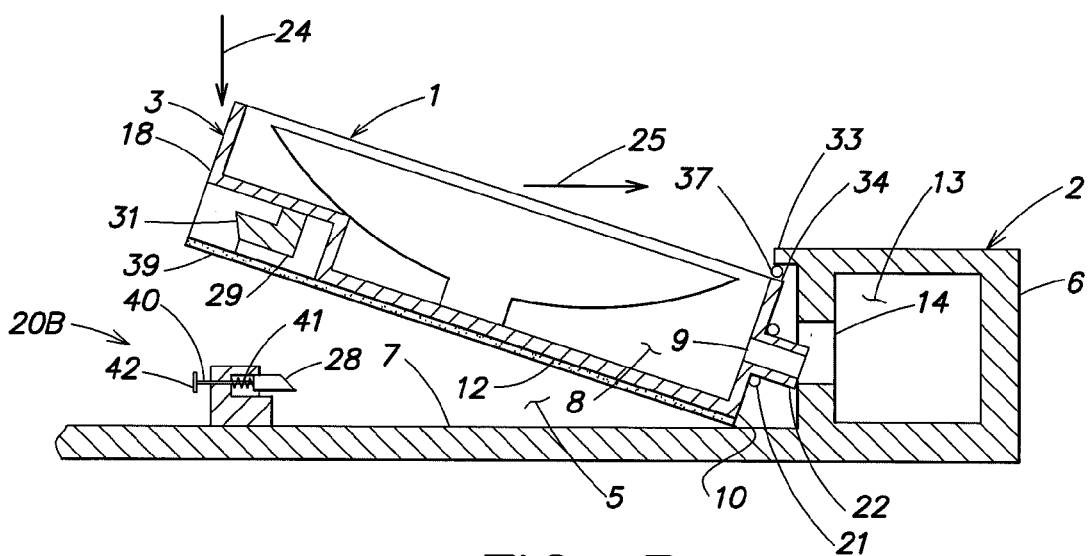
FIG. 3 illustrates a speaker assembly arrangement configured with a speaker cabinet having a snap-fit fastener.

FIG. 3 illustrates a speaker assembly arrangement for a vehicle in which the rigid member 29 of the snap-fit fastening 20B is arranged on the speaker cabinet 3 and the resilient member 28 of the snap-fit fastener 20B is positioned on the floor panel 7 of the vehicle. The speaker assembly arrangement may further include a layer of vibration damping material 39 positioned on the lower surface 12 of the speaker cabinet 3. The vibration damping material 39 vibrationally isolates the speaker unit 1 from the body part 2 of the vehicle so as to improve the quality of the sound. The vibration damping material 39 may also be provided with a sufficient thickness such that the speaker unit 1 is biased against the retaining member 33. This further prevents movement of the speaker unit 1 within the mounting area 5 thus avoiding rattles and improving the quality of the sound.

Disengagement mechanism 40 may be connected to the resilient member 28 of the snap-fit fastener 20B. The disengagement mechanism 40 enables the resilient member 28 to be disengaged from the rigid member 29 so as to allow the speaker unit 1 to be demounted from the body part 2 of the vehicle. This is useful, for example, where the speaker unit 1 is removed for repair. The resilient member 28 is illustrated as including a spring 41 and is connected to a grasping portion 42 of the disengagement mechanism 40. The resilient member 8 may be pulled away from the rigid member 29 thus disengaging the snap-fit and enabling the speaker cabinet 3 to be demounted from the body part 2.

Figure 4:
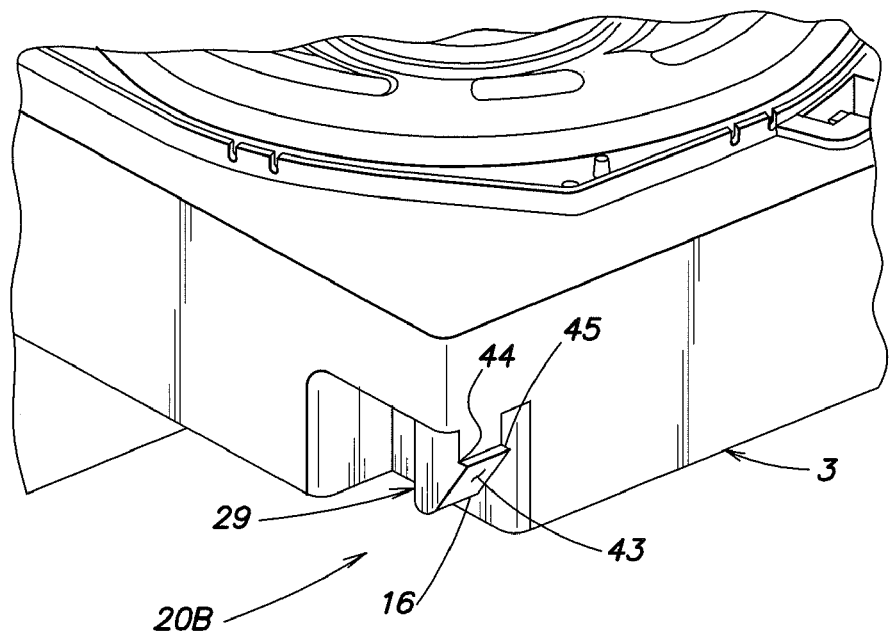
FIG. 4 illustrates a speaker assembly arrangement with a snap-fit fastener for mounting a speaker cabinet on a body part.
Figure 5:
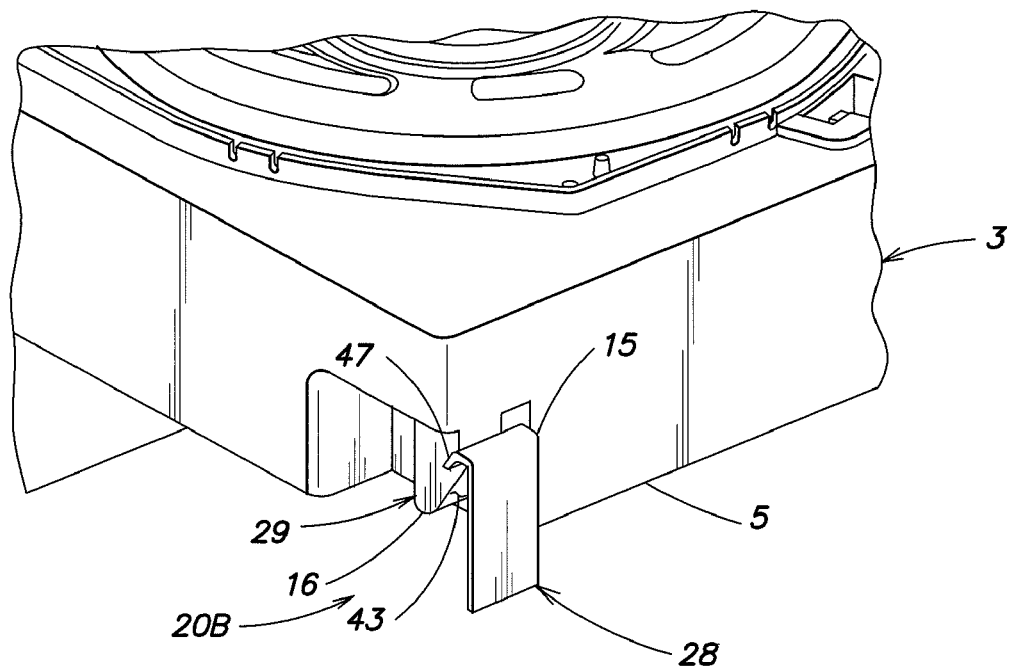
FIG. 5 illustrates the speaker assembly arrangement of FIG. 4 when assembled.

FIGS. 4 and 5 illustrate detailed views of a speaker assembly arrangement for a vehicle where a snap-fit fastening 20B is used to mount the speaker cabinet 3 on the body part 2. The rigid member 29 of the snap-fit fastener 20B is arranged on the speaker cabinet 3 and includes an inclined surface 43 defining the second guide 16. The inclined surface of the protrusion which faces outwardly from the speaker cabinet 3 includes a cut-out 44 in the top edge defining a horizontal shelf 45.

The resilient member 28 of the snap-fit fastener 20B is arranged on the floor panel 7 and the rigid member 29 is pressed in a generally vertical direction onto the resilient member 28. The inclined surface 43 slidably engages with the resilient member 28 such that a force on the speaker cabinet in a direction generally perpendicular to the floor panel is partially redirected so as to push the speaker cabinet in the direction of the longitudinal axis of the speaker through-hole 9, and to push the protrusion 22 defining the speaker through-hole 9 into the body through-hole 14 of the sill 6. This movement in the direction of the longitudinal axis acoustically couples the speaker cabinet 3 to the sill 6 is an air-tight and water-tight press-fit connection.

The assembled snap-fit fastener 20B is illustrated in FIG. 5. The resilient member 28 further includes a resilient foil portion 47 which extends towards the rigid member 29 in the mounting position 5 of the speaker cabinet 3. The resilient engaging member 28 may include a through-hole (not shown) with the resilient foil portion 47 extending into the through-hole. When the rigid member 29 attached to the speaker unit 1 is pressed onto the resilient member 28 arranged on the floor panel, the resilient foil portion 47 engages with the cut-out 44 and the shelf 45 of the rigid member 29 to mount the speaker cabinet 3 on the body part 2 by a snap-fit. This arrangement has the advantage that only a small modification to the outer form of the protrusion is required to provide the rigid member. This can be simply performed during manufacture of the speaker cabinet. Further additional parts are not necessary to provide the rigid member or the second guide.

Figure 6:
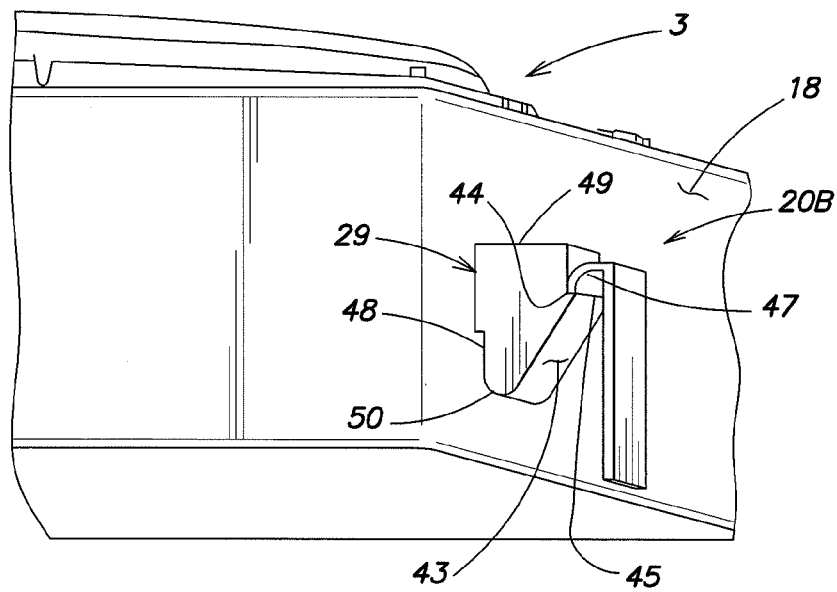
FIG. 6 illustrates a speaker assembly arrangement with a snap-fit fastener of a speaker assembly arrangement where the rigid member is a clip connector.

FIG. 6 illustrates a detailed view of a snap-fit fastener 20B of a speaker assembly arrangement where the rigid member 29 is a clip connector 48 including a lid 49 and a protruding portion 50 which protrudes from the lower surface of the lid portion 49 and which has an inclined surface 43 defining the second guide. The resilient member 28 of the snap-fit fastener 20B includes a resilient foil 47 that engages with the cut-out 44 and the shelf 45 (illustrated in FIGS. 4 and 5) of the rigid member 29 to define a snap-fit connection. The rigid member 29 may be arranged on a flat side face (e.g., side face 18) of the speaker cabinet 3, as shown in FIG. 6, or in a cavity of the speaker cabinet 3 such that the horizontal shelf 45 is aligned with a flat side face of the speaker cabinet 3, as shown in FIG. 5. However, it should be noted that the orientation of the rigid member 29 are not limited to the configurations illustrated in FIGS. 5 and 6. The rigid member 29 may be disposed on any of the side faces of the speaker cabinet 3. For example, in some embodiments, several rigid members 29 may be arranged on different side faces of the speaker cabinet 3.

Figure 7:
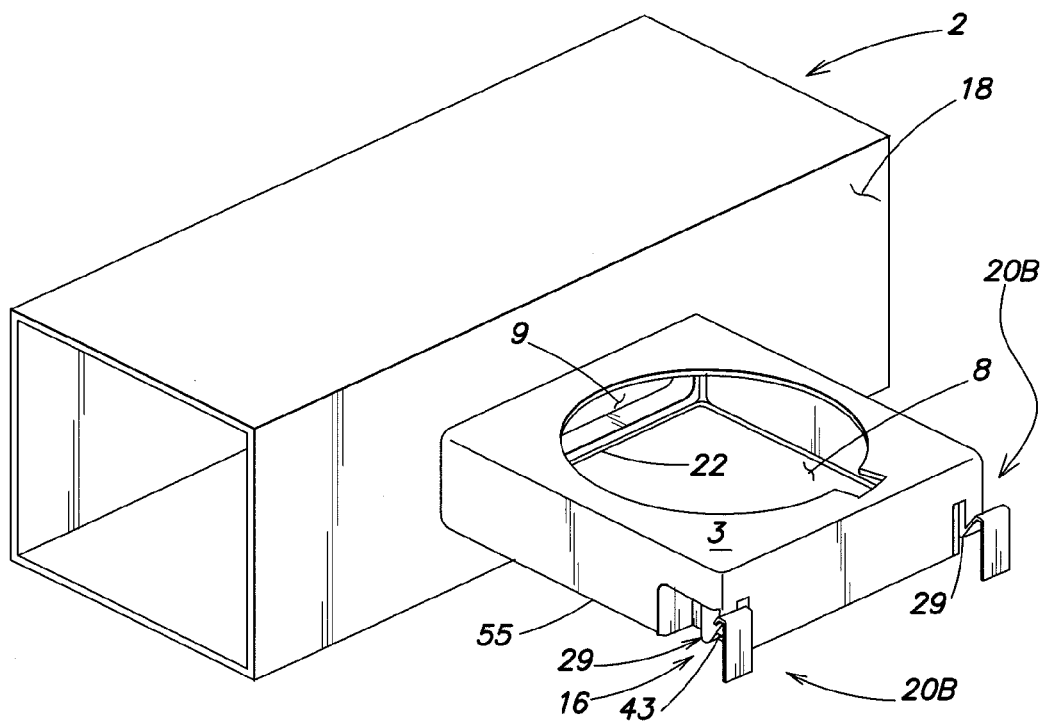
FIG. 7 is a perspective view of a speaker cabinet.

FIG. 7 is a perspective view of a speaker cabinet 3 in which the protrusion 22 defining the speaker through-hole 9 and the first resonance volume 8 are illustrated. In the arrangement of FIG. 7, second guide 16 is provided by a portion of the interior trim 55 and an inclined surface 43 of a protrusion arranged on the speaker cabinet. The speaker cabinet 3 is mounted on the interior trim by a snap-fit connection between the rigid member 29 of the speaker and the resilient member 28 arranged on the floor panel 7. In some embodiments, at least one screw fastener may also be used. In this arrangement, the inclined surface is arranged on a side face of the speaker cabinet 3 which is arranged generally perpendicularly to the sill 6 (not illustrated) and the side face 10 including the speaker through-hole 9.

Figure 8:
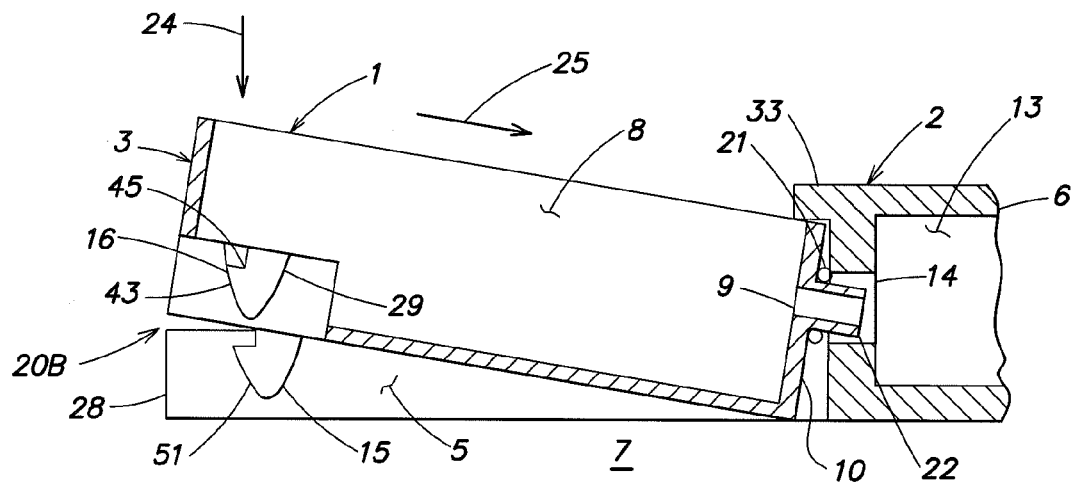
FIG. 8 is a detailed view of a speaker assembly arrangement where a speaker cabinet is mounted on the floor panel by a snap-fit fastener.

FIG. 8 illustrates a speaker assembly arrangement where the speaker cabinet 3 is mounted on the floor panel 7 by a snap-fit fastener 20B which includes a rigid member 29 arranged on the speaker cabinet 3 and a recess 51 arranged on the floor panel 7. The rigid member 29 has an inclined surface 43 with a cut-out and shelf 45 as in the arrangement illustrated in FIGS. 4 and 5.

Figure 9:
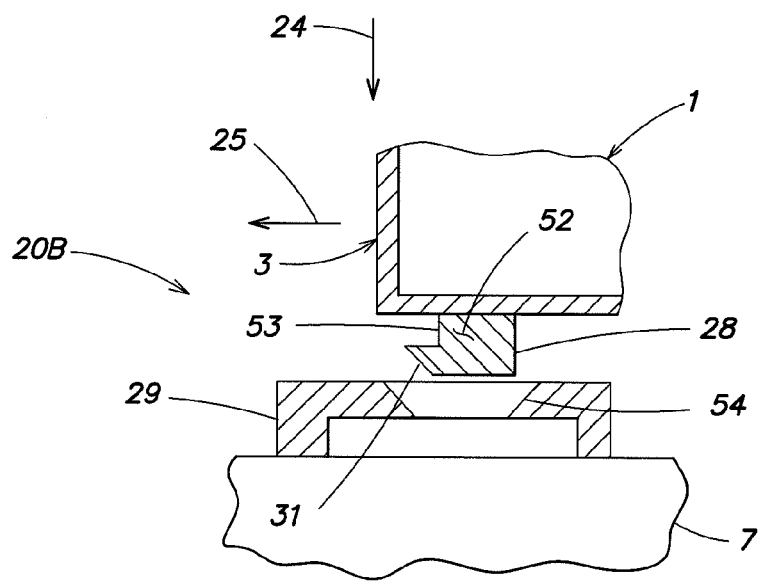
FIG. 9 illustrates a speaker assembly arrangement where a snap-fit fastener comprises a resilient member.

FIG. 9 illustrates a speaker assembly arrangement where the snap-fit fastener 20B includes a resilient member 28 arranged on the speaker cabinet 3 and a rigid member 29 arranged on the body part 2 of the vehicle. The resilient member 28 includes a protrusion 52 that has a reduced cross-section 53 in a region and a protruding portion 31 that extends generally orthogonally to the body of the protrusion 52. The protrusion 52 may be deflected around the narrowed portion 53 so as to provide the protrusion 52 with resilience.

A through-hole 54 which is positioned in the mounting position 5 is configured having dimensions such that the protruding portion 31 of the resilient member 28 engages the lower surface of the mounting position 5 adjacent to the through-hole 54 and the body of the protrusion 52, and is positioned in the through-hole 54 to define a snap-fit connection. The resilient member 28 and rigid member 29 of the snap-fit fastener 20B are configured to slidably engage before the snap-fit connection is produced such that force redirected from a vertical direction to a horizontal direction and in particular in the press-fit direction so as to produce a press-fit between the speaker cabinet through-hole 9 and the body through-hole 14 extending into the hollow member of the body part 2.

In the arrangements illustrated above, the speaker unit 1 is illustrated as a low-frequency loudspeaker of a vehicle stereo system mounted on the floor panel 7 under the seat of the vehicle. However, the speaker assembly arrangements may also be used to mount a speaker cabinet of other types of loudspeaker on other body parts such as, but not limited to, a seat cross-beam, an interior panel such as an interior door panel or a trim panel.

The speaker assembly arrangement may include two or more fasteners, such as screw fasteners and/or snap-fit fasteners, which may or may not be the same. Fastener may also be arranged on two opposing sides of the speaker cabinet or on three of four sides of the base of the speaker cabinet. The fastener may be arranged on the top side or on the side face of the speaker cabinet such that it protrudes outwardly. In the case of a screw fastener, a portion protruding from the speaker cabinet may be provided which includes a through-hole for accommodating screw. The through-hole is positioned so as to be aligned with a threaded hole arranged on a raised portion of the body part (or body work) of the vehicle such that the screw may be positioned in the through-hole of the speaker cabinet and fasten the speaker cabinet to the body part by engaging the thread of the screw with the threaded hole in the body part.

In the case of a snap-fit fastener, the first engagement member (e.g., the first guide) may protrude outwardly from the speaker cabinet so as to engage with the second engagement member (e.g., the second guide) of the snap-fit fastener which is arranged adjacent the side face of the speaker cabinet on a raised portion of the body part. The mounting position 5 may also be contoured so as to provide a recess for receiving the speaker unit 1.

The speaker assembly arrangement described herein may be used to mount a speaker unit to a body part of a vehicle using exclusively one or more screw fasteners or exclusively one or more snap-fit fasteners. However, a combination of snap-fit fasteners and screws may also be used. The combination of snap-fit fasteners and screws also simplifies the mounting of the speaker unit since the number of screws can be reduced and the screws arranged in awkward to tighten positions maybe be replaced by snap-fit fasteners.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Such modifications to the inventive concept are intended to be covered by the appended claims.

What is claimed is:

1. A loud speaker assembly arrangement for a vehicle, comprising:
a speaker unit including a speaker cabinet defining a first volume, the speaker cabinet having a speaker through-hole having a longitudinal axis and being arranged in a side face of the speaker cabinet;
a body part of the vehicle including a hollow member defining a second volume, the hollow member having a body through-hole;
where the speaker through-hole is coupled to the body through-hole by a press-fit coupling having a press-fit direction arranged generally along the longitudinal axis of the speaker though-hole, and where the first volume of the speaker cabinet and the second volume of the hollow member of the body part are pneumatically coupled;
where the speaker cabinet is mounted on the body part by at least one fastener positioned adjacent the hollow member of the body part, and where the at least one fastener has a fastening direction substantially perpendicular to the press-fit direction; and
where the body part includes a first guide arranged and configured to slidably engage with a second guide arranged on the speaker cabinet such that when the second guide contacts the first guide, force on the speaker cabinet in the fastening direction is at least in part redirected to the press-fit direction by the slidable engagement of the first guide and the second guide.

2. The speaker assembly arrangement of claim 1, where the force on the speaker cabinet in the fastening direction is at least in part redirected to the press-fit direction by the slidable engagement between the first guide and the second guide so as to engage the speaker through-hole with the body through-hole by an air tight press-fit seal.

3. The speaker assembly arrangement of claim 1, where the body part further comprises a retaining member, where the retaining member and the first guide co-operate to define a mounting position in which the speaker cabinet is mounted.

4. The speaker assembly arrangement of claim 3, where the retaining member includes at least one protrusion extending over an edge region of the speaker cabinet.

5. The speaker assembly arrangement of claim 1, where the press-fit coupling further comprises an annular seal.

6. The speaker assembly arrangement of claim 1, where the first guide is an inclined surface extending from the body part and increasing in height in a direction away from the hollow member of the body part.

7. The speaker assembly arrangement of claim 1, where the second guide comprises an inclined surface.

8. The speaker assembly arrangement of claim 1, where the at least one fastener comprises a screw fastener.

9. The speaker assembly arrangement of claim 1, where the at least one fastener comprises a snap-fit fastener.

10. The speaker assembly arrangement of claim 9, where the snap-fit fastener includes a rigid engaging member and a resilient engaging member adapted to define a snap-fit connection when engaged with one another.

11. The speaker assembly arrangement of claim 10, where the resilient engaging member is elastically resilient.

12. The speaker assembly arrangement of claim 10, where the resilient engaging member is disposed on the speaker cabinet and the rigid engaging member is disposed on the body part.

13. The speaker assembly arrangement of claim 10, where the rigid engaging member is disposed on the speaker cabinet and the resilient engaging member is disposed on the body part.

14. The speaker assembly arrangement of claim 10, where the resilient engaging member further comprises a disengaging element for disengaging the resilient engaging member from the rigid engaging member.

15. The speaker assembly arrangement of claim 10, where the resilient engaging member comprises a through-hole with a resilient foil portion extending into the through-hole.

16. The speaker assembly arrangement of claim 10, where the rigid engaging member comprises a protrusion.

17. The speaker assembly arrangement of claim 1, further comprising a vibration damper configured between the speaker unit and the body part of the vehicle.

18. The speaker assembly arrangement of claim 1, where the hollow member is substantially within a sill of the vehicle.

19. The speaker assembly arrangement of claim 1, where the body part comprises substantially a floor panel.

20. A method for mounting a speaker unit onto a body part of a vehicle, comprising:
providing a body part of a vehicle including a first guide and a hollow member defining a second volume, the hollow member having a body through-hole;
providing a speaker unit including a speaker cabinet defining a first volume, the speaker cabinet including a second guide and a speaker through-hole in a side face, the speaker though-hole having a longitudinal axis defining a press-fit direction, the first guide of the body part being arranged and configured to slidably engage with second guide;

arranging the second guide on the speaker cabinet in contact with the first guide of the body part;

exerting force on the speaker cabinet in a direction generally perpendicular to the press-fit direction and slidably engaging the first guide and the second guide, whereby the force is at least in part redirected to the press-fit direction so as to couple the speaker through-hole to the body through-hole by a press-fit coupling and to acoustically couple the first volume of the speaker cabinet and the second volume of the hollow member of the body part; and mounting the speaker cabinet onto the body part by at least one fastener positioned adjacent the hollow member of the body part, the at least one fastener having a fastening direction substantially perpendicular to the press-fit direction.

21. The method of claim 20, where when exerting the force, the speaker cabinet is pivoted about an axis extending generally parallel to an edge of the speaker cabinet so that the rear side of the speaker cabinet nears the surface of a panel of the vehicle.

22. The method of claim 20, where the speaker through-hole is arranged adjacent the body through-hole and the second guide is arranged on the first guide.

23. The method of claim 20, where the speaker cabinet is mounted on the body part by at least one screw fastener arranged in the fastening direction.

24. The method of claim 20, where the speaker cabinet is mounted on the body part by at least one snap-fit fastener arranged in the fastening direction.

25. The method of claim 20, where the speaker cabinet is mounted on a floor panel by the at least one fastener.

26. The method of claim 20, where the speaker cabinet is acoustically coupled to a sill of the vehicle by the press-fit coupling.

27. A speaker assembly for acoustically coupling with a first internal volume defined by a body part of a motor vehicle, the body part having a first guide and a body through-hole acoustically coupled to the first internal volume, the speaker assembly comprising:

a speaker cabinet defining a second internal volume and having a speaker through-hole disposed on one side thereof, the speaker through-hole positioned such that when the speaker assembly is coupled to the body part, the first and the second internal volumes are acoustically coupled through the speaker and the body through-holes;

a second guide disposed on the speaker cabinet and adapted such that when the speaker assembly is coupled to the body part, the first and the second guides slidably engage thereby aligning and press fitting in a first direction the speaker through-hole in the speaker cabinet to the body through-hole in the body part, where the second guide is located at or near a side of the speaker cabinet substantially opposite the side in which the speaker through-hole is disposed; and a fastener disposed on the speaker cabinet and operable to removably secure the speaker cabinet to the body part in a second direction that is substantially perpendicular to the first direction.

28. The speaker system of claim 27, where the speaker through-hole is defined by a protrusion that extends from the speaker cabinet and is adapted to mate with the body through-hole in the body part.

29. The speaker system of claim 27, where the fastener is located at or near a side of the speaker cabinet substantially opposite the side in which the speaker through-hole is disposed.

* * * * *